(12) United States Patent
Grouillet et al.

(10) Patent No.: US 10,527,208 B2
(45) Date of Patent: Jan. 7, 2020

(54) COMPOSITE SEAL FOR RAPID FLUID-TRANSFER COUPLING, AND COUPLING OF THIS TYPE

(71) Applicant: HUTCHINSON, Paris (FR)

(72) Inventors: Philippe Grouillet, Conflans sur Loing (FR); Jean-Luc Faillu, Villemandeur (FR)

(73) Assignee: HUTCHINSON, Paris (FR)

( * ) Notice: Subject to any disclaimer, the term of this patent is extended or adjusted under 35 U.S.C. 154(b) by 341 days.

(21) Appl. No.: 15/524,402

(22) PCT Filed: Nov. 5, 2014

(86) PCT No.: PCT/FR2014/052823
§ 371 (c)(1),
(2) Date: Sep. 25, 2017

(87) PCT Pub. No.: WO2016/071583
PCT Pub. Date: May 12, 2016

(65) Prior Publication Data
US 2018/0017194 A1    Jan. 18, 2018

(51) Int. Cl.
*F16L 17/035*    (2006.01)
*F16L 21/03*    (2006.01)

(52) U.S. Cl.
CPC ............ *F16L 17/035* (2013.01); *F16L 21/03* (2013.01)

(58) Field of Classification Search
CPC ...... F16L 17/035; F16L 21/03; F16J 15/3252; F16J 15/3212; F16J 15/3276
See application file for complete search history.

(56) References Cited

U.S. PATENT DOCUMENTS

| 2,953,398 A | 9/1960 | Haugen et al. |
| 4,579,352 A | 4/1986 | Adang |
| 5,370,404 A * | 12/1994 | Klein .................... F16C 27/066 277/572 |

(Continued)

FOREIGN PATENT DOCUMENTS

| DE | 19645985 A1 | 5/1998 |
| DE | 10201102477 U1 | 5/2001 |

(Continued)

*Primary Examiner* — James M Hewitt, II
(74) *Attorney, Agent, or Firm* — Browdy and Neimark, PLLC

(57) ABSTRACT

The invention relates to a composite annular seal (30) having a flexible body and rigid reinforcement (35) for a rapid fluid-transfer coupling (1), and to a rapid coupling of this type incorporating the seal. The seal (30) with a reinforcement (35) can be used for a coupling comprising a female tubular sleeve (10) and a male tubular endpiece (20) mounted inside the sleeve in order to produce overall static sealing between a recess (13) in the sleeve (10) and the endpiece (20), the seal comprising: an inner axial wing (31) having a radially inner face (31*a*) which has a radially innermost flexible peripheral portion (31*aa*) designed to be applied tightly against the endpiece; an outer axial wing (36) having a flexible radially outer face (36*a*) which is designed to be placed firmly against the recess; and a core (33) connecting the inner wing to the outer wing. According to the invention, the innermost peripheral portion (31*aa*) is convex, with a rounded shape in axial section.

15 Claims, 2 Drawing Sheets

(56) References Cited

U.S. PATENT DOCUMENTS

Figure 3:
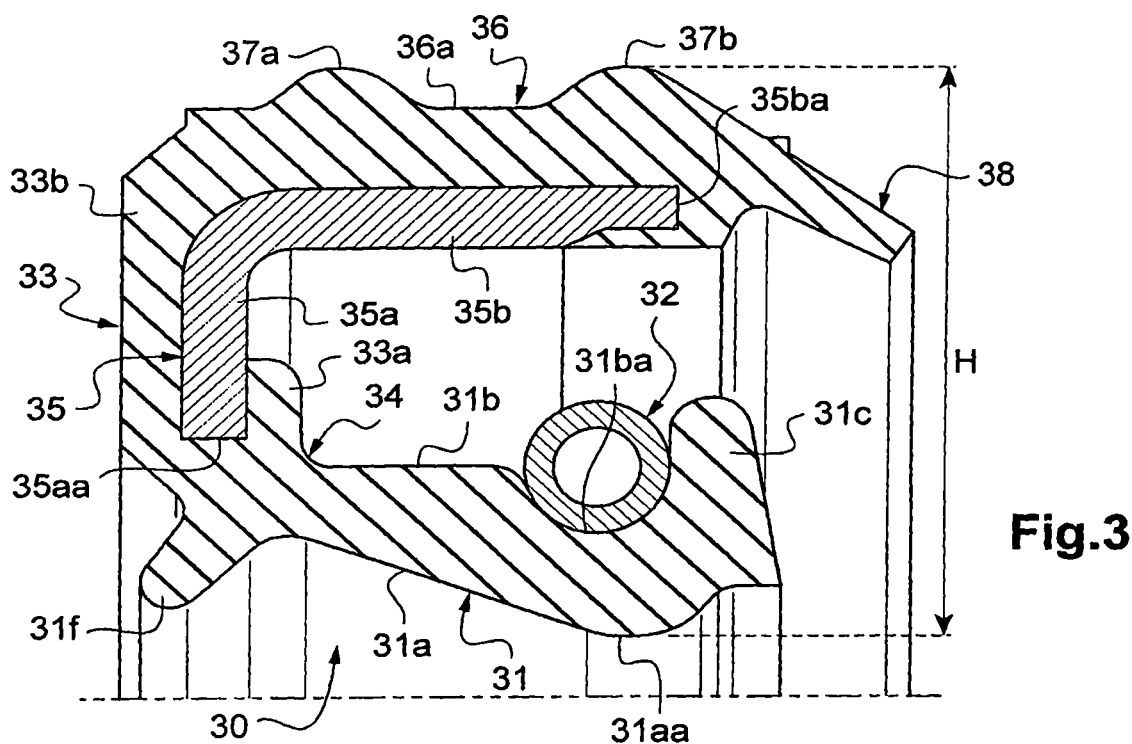

| | | | | |
|---|---|---|---|---|
| 5,642,889 | A * | 7/1997 | Pauler | F16J 15/3276 |
| | | | | 277/552 |
| 5,697,710 | A * | 12/1997 | Iida | B21B 31/078 |
| | | | | 384/473 |
| 6,053,502 | A * | 4/2000 | Hallenstvedt | F16J 15/3268 |
| | | | | 277/551 |
| 6,666,459 | B1 * | 12/2003 | Hufnagel | F16J 15/3232 |
| | | | | 277/572 |
| 2005/0134004 | A1 * | 6/2005 | Yoon | F01L 1/02 |
| | | | | 277/549 |
| 2006/0175765 | A1 | 8/2006 | Happel et al. | |
| 2006/0251511 | A1 * | 11/2006 | Rosenkranz | F04C 15/0038 |
| | | | | 415/170.1 |
| 2008/0023893 | A1 | 1/2008 | Hamaya et al. | |
| 2008/0036159 | A1 * | 2/2008 | Yanagi | F16J 15/3212 |
| | | | | 277/594 |
| 2008/0079222 | A1 * | 4/2008 | Namuduri | F16J 15/164 |
| | | | | 277/359 |
| 2011/0068542 | A1 * | 3/2011 | Nakagawa | F16J 15/3244 |
| | | | | 277/549 |
| 2012/0153575 | A1 * | 6/2012 | Drucktenhengst | F16J 15/3212 |
| | | | | 277/560 |
| 2013/0313786 | A1 | 11/2013 | Fangauf et al. | |
| 2015/0014941 | A1 * | 1/2015 | Yanagiguchi | F16J 15/3212 |
| | | | | 277/549 |
| 2018/0058585 | A1 * | 3/2018 | Sato | F16J 15/3216 |
| 2018/0274682 | A1 * | 9/2018 | Shimizu | F16J 15/3204 |

FOREIGN PATENT DOCUMENTS

| | | |
|---|---|---|
| DE | 102010041611 A1 | 3/2012 |
| DE | 102011102477 A1 | 11/2012 |
| EP | 0317903 A1 | 5/1989 |
| GB | 2364808 A | 2/2002 |
| JP | 2001082650 A | 3/2001 |
| WO | 2006037967 A1 | 4/2006 |
| WO | 2006077677 A1 | 7/2006 |

\* cited by examiner

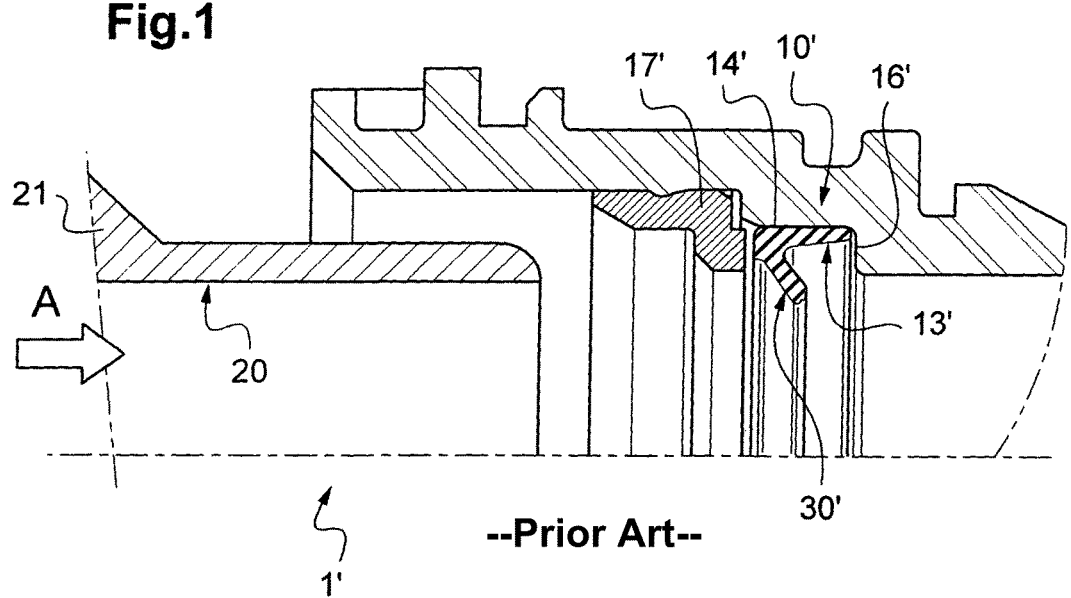
Fig.1 --Prior Art--
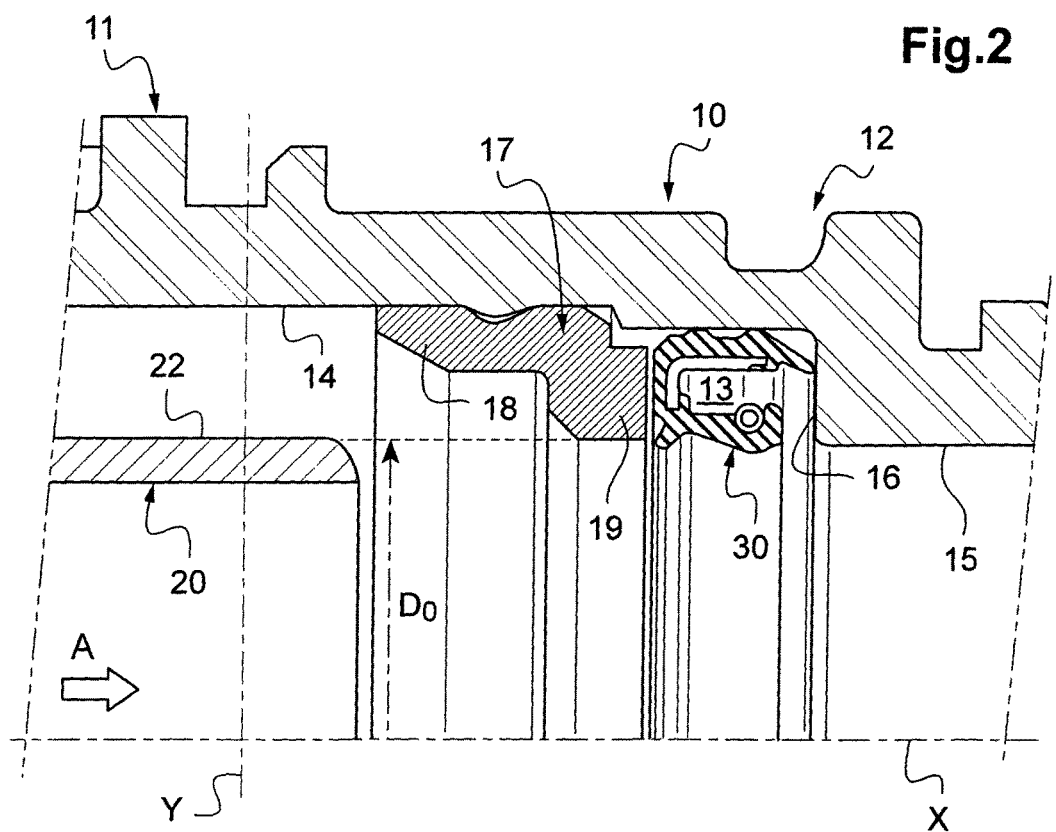
Fig.2

COMPOSITE SEAL FOR RAPID FLUID-TRANSFER COUPLING, AND COUPLING OF THIS TYPE

The present invention relates to an annular seal with a reinforcement usable in a rapid fluid-transfer coupling, and this rapid coupling incorporating such a seal. The invention in particular applies to rapid couplings in the automobile field, including vehicles moved by an internal combustion engine of the passenger, utility, heavy truck, construction (e.g., civil engineering), or even agricultural type, and in the field of fixed installations (e.g., generating sets, compressors, pumps) using a similar combustion engine. For these two groups of applications, the device according to the invention may in particular equip a cleanup, cooling, or advantageously, air supply circuit.

In general in a fluid-transfer circuit for a motor vehicle, it is known, in order to tightly connect a flexible hose to a locking rigid male endpiece, to use a globally static coupling comprising a polymeric connector or sleeve body and this male endpiece is inserted through one end of the sleeve, the other end of the sleeve being gripped by the hose. In the present description and in a known manner, "globally static coupling" refers to a static or substantially static coupling, i.e., the sleeve and endpiece of which are not movable in permanent relative rotation, unlike dynamic rotary shaft couplings, being practically immobile relative to one another.

As illustrated by FIG. 1, which shows one representative example of such a known rapid coupling 1' of the globally static type, the sleeve 10' typically has an annular recess 13' that is formed by a radial shoulder 16' and a cylindrical inner face 14' of the sleeve 10' that receives a static annular seal 30'. This static seal 30', which is generally of the lip seal type and made from an injection-molded elastomer, is mounted gripped between the inner face 14' of the sleeve 10', the shoulder 16' and the male endpiece 20 with a peripheral protrusion 21, once the latter is inserted radially and axially inside the sleeve 10' and in contact with the seal 30' in the direction of the arrow A, this seal 30' further being axially inserted between the shoulder 16 and a spacer 17' fastened to the inner face of the sleeve 10'.

One major drawback of this elastomeric seal 30' lies in its single-material structure, which is responsible for natural aging causing the seal 30' to lose a significant part of its properties over time and leading to a gradual decrease in the gripping effect of the seal 30' against the endpiece 20 and the sleeve 10', resulting in the potential appearance of unwanted seepage or leaks.

Another drawback of this known elastomeric seal 30' is that it requires radial compression by the operator during axial mounting of the endpiece 20, which results in a high mounting force.

Annular seals for static or dynamic use also exist of the composite type, being made up of a rubber seal body and a rigid reinforcement (e.g., metal), as for example described in document EP-A1-0,317,903 and U.S. Pat. No. 4,579,352, each having such a seal with a U-shaped axial section that is reinforced by an L-shaped reinforcement and the inner wing of which is pre-stressed by a spring.

In particular, the seal described in EP-A1-0,317,903 has:
an inner sealing wing that is provided, on its inner face, with a circumferential edge intended to provide sealing with an inner endpiece and, on its outer face, with a radial compression spring mounted substantially across from this inner sealing edge,
a radial core that incorporates the reinforcement, and
an outer sealing wing that is provided with bosses on its outer face and that also incorporates the reinforcement.

One major drawback of this composite seal lies in this sealing edge that it has on its inner wing and which, although suitable for a dynamic application of the seal (i.e., while being pressed on a shaft of a rotary coupling), is not satisfactory in this respect for static application due to the fact that in the long-term, this sealing edge may cause a sealing defect and unwanted seepage during the transfer of the fluid.

One aim of the present invention is to propose a composite annular seal having a flexible body (in particular elastomeric) and rigid reinforcement, usable in a rapid fluid-transfer coupling that resolves all of the aforementioned drawbacks, the coupling comprising a female tubular sleeve and a male tubular endpiece mounted radially inside the sleeve in order to produce globally static sealing between an inner recess of the sleeve and a cylindrical outer surface of the endpiece, the seal comprising:

a radially inner axial wing having a radially inner face which has a radially innermost flexible (e.g., elastomeric) peripheral portion designed to be applied tightly against said outer surface of the endpiece,
a radially outer axial wing having a flexible (e.g., elastomeric) radially outer face designed to be pressed firmly against said recess, and
a core connecting said inner wing to said outer wing.

To that end, a seal according to the invention is such that said innermost peripheral portion is convex, with a rounded shape in axial section.

It will be noted that the Applicant has verified, during its work, that this convex and rounded innermost portion significantly improves the sealing against the transferred fluid and the resistance to seepage of the seal in a globally static coupling (i.e., without permanent relative rotation between the sleeve and the endpiece), compared with an innermost portion defined by the aforementioned edge of the prior art in contact with a rotary shaft. Thus, such a globally static seal according to the invention is suitable for optimizing this sealing and minimizing this seepage within a coupling, for example a snap-on coupling, with a sleeve and endpiece that are immobile relative to one another, or at the very least movable through translational movements, for example alternating, or by alternating rotational movements of small amplitude (for example, several degrees) between the sleeve and the endpiece.

It will also be noted that this convex and rounded innermost portion is continuous in the circumferential direction.

Advantageously, said innermost circumferential portion may have an arc of circle shape in axial section giving it a truncated torus circumferential shape (i.e., closed torus truncated by its cross-section, which is not completely circular).

Still more advantageously, this portion may have a radius comprised between 0.5 mm and 3.0 mm for an inner diameter of said inner wing in the state applied against the endpiece comprised between 35 mm and 100 mm (i.e., for an outer diameter of the endpiece comprised between 35 mm and 100 mm).

According to another feature of the invention, said inner wing may be provided with a return means that pre-stresses it radially inward.

Advantageously, this return means may comprise an annular metal radial compression spring that is mounted on a radially outer face of said inner wing while being centered in axially offset manner relative to said innermost circumferential portion.

It will be noted that a composite seal according to the invention resolves the aforementioned drawbacks of single-material static seals by no longer making the gripping force of the inner wing of the seal on the endpiece dependent on the aging of the elastomer, since it is this return means that provides it, and the normal operating conditions of a fluid circuit for a motor vehicle are not of a nature to alter this return means of the metal spring type (whether made from simple or stainless steel).

According to another feature of the invention, said outer wing may comprise a free end formed by a circumferential flexible (e.g., elastomer) sealing lip that is suitable for being pressed by said pressurized fluid against said recess, and which extends axially while moving away from said core and radially inward (i.e., obliquely).

Advantageously, said sealing lip may have a length projected in the axial direction comprised between 0.8 mm and 3.0 mm for an inner diameter of said inner wing in the state gripped against the endpiece comprised between 35 mm and 100 mm (i.e., for an outer diameter of the endpiece comprised between 35 mm and 100 mm).

It will be noted that this sealing lip may extend obliquely, continuously or discontinuously, in the circumferential direction, and results in improving the sealing with the recess of the sleeve over time, owing to the pressure of the fluid, which keeps this lip pressed against this recess.

It will also be noted that the sealing of the outer wing of the seal in the recess of the sleeve is provided by the compression of the assembly, and is preserved over time by the reinforcement and by said sealing lip.

It will further be noted that during the axial insertion of the endpiece inside the sleeve, the operator only perceives the gripping of the inner wing of the seal provided with the return means, and therefore a smaller mounting force than with an elastomeric single-material seal.

According to another feature of the invention, said outer face of said outer wing may comprise at least one circumferential flexible (e.g., elastomeric) boss or bead that is suitable for being pressed against the recess and that has, in axial section, an arc of circle shape giving it a truncated torus circumferential shape, and preferably several said bosses separated by an axial segment.

It will be noted that said or each elastomeric boss may be continuous or discontinuous in the circumferential direction, and gives the seal a second radially outer tightness added to the first outer tightness procured by said lip via the pressure of the fluid pressing against the wall of said recess.

In general, the seal may, when idle, have a substantially U-shaped axial section, said core extending radially and being reinforced by said reinforcement, which extends in that said outer wing while forming a "L" in axial section, said reinforcement being made from metal or rigid plastic (for example, a thermoplastic material such as a plastic elastomer) and angularly and continuously reinforcing the elastomeric body of the seal. This elastomeric seal body can for example be made from a rubber or a thermoplastic elastomer and then in particular comprises said convex and rounded innermost portion and said outer face of the outer wing.

According to another feature of the invention, said innermost circumferential portion extends axially toward said core by an oblique ramp extending radially inward to a connecting portion forming a hinge that can connect said inner wing to said core and be provided with a circumferential protection lip extending radially inward at the end of said ramp.

Advantageously, said hinge may have a thickness comprised between 0.5 mm and 1.0 mm for an inner diameter of the inner wing in the state gripped against the endpiece comprised between 35 mm and 100 mm (i.e., for an outer diameter of the endpiece comprised between 35 mm and 100 mm).

It will be noted that said hinge may optionally have a reduced height, compared with the hinges of the known U-shaped seals, which makes it possible to absorb more pronounced centering flaws between the recess and the endpiece.

A quick fluid-transfer coupling according to the invention may be used to couple a rigid male tubular endpiece to a flexible female hose, the coupling comprising:
  a female tubular sleeve, preferably molded by injecting a plastic material or a plastic matrix composite,
  the endpiece, which is mounted radially and axially inside the sleeve and which has a cylindrical outer surface, and
  an annular seal with a reinforcement that is housed in an inner recess of the sleeve and is suitable for being gripped against said outer surface of the endpiece so as to produce globally static sealing between the sleeve and the endpiece,
  and this seal is as defined above.

As previously explained, the sleeve and the endpiece of such a coupling according to the invention are not movable in permanent relative rotation during fluid transfer, only being able to be movable in relative translation during operation during said transfer or following alternating rotating movements of several degrees.

According to another feature of the invention, said recess of the sleeve can be defined by:
  a first inner cylindrical face of the sleeve having a first diameter,
  a second inner cylindrical face of the sleeve having a second diameter smaller than said first diameter,
  an annular shoulder that radially connects said first face to said second face, and
  an annular stop for the seal that extends radially from said first face and against which the seal is axially juxtaposed,
  the seal being mounted bearing against said first face of the sleeve while being wedged in said shoulder and said stop and while having a radial seal height substantially equal to that of said shoulder.

Advantageously, the stop may comprise a spacer including an axial fastening portion mounted below said first face and a radial stop portion that extends said axial portion toward said shoulder and that has a radial stop height substantially equal to said radial height of the seal.

Figure 4:
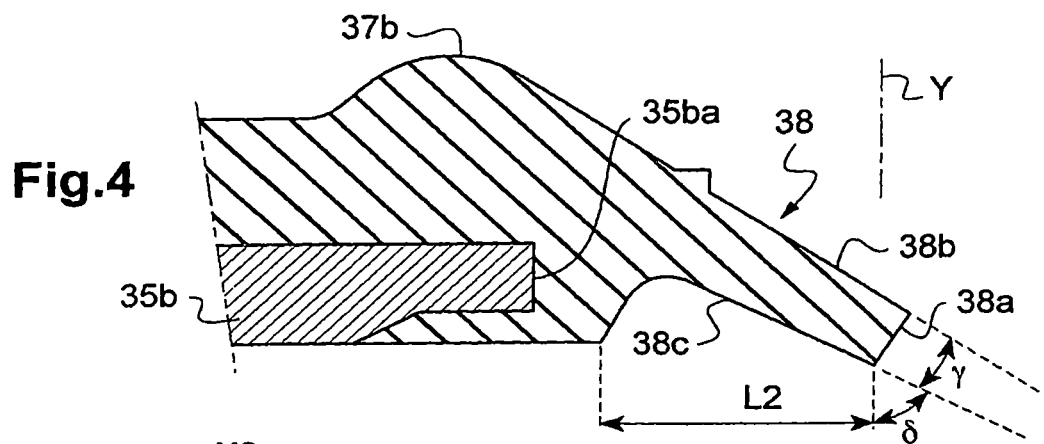
Figure 5:
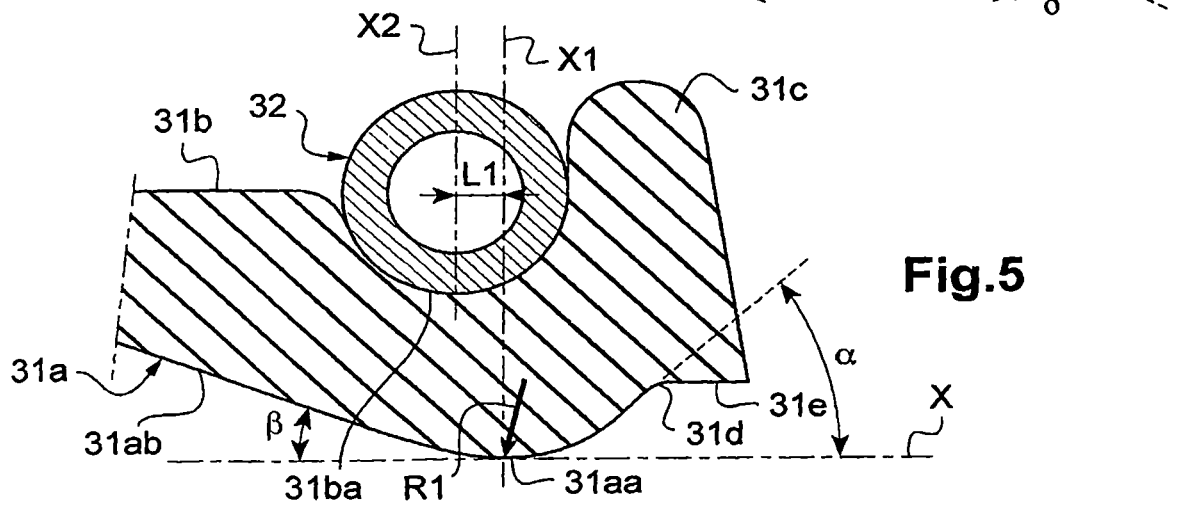

Other features, advantages and details of the present invention will emerge from reading the following description of one example embodiment of the invention, provided as an illustration and non-limitingly, the description being done in reference to the attached drawings, in which:

FIG. 1 is a partial schematic half-sectional axial view of a quick coupling according to the prior art comprising a known elastomeric seal, FIG. 2 is a partial schematic half-sectional axial view of a quick coupling according one example of the invention, comprising an elastomeric composite seal with a reinforcement, FIG. 3 is an enlarged axial half-sectional view of the composite seal visible in FIG. 2, FIG. 4 is a detailed view of the free end of the outer wing of the seal of FIGS. 2 and 3, and FIG. 5 is a detailed view of the inner wing of the seal of FIGS. 2 and 3.

In the present description, the expressions "in front" or "front" refer to relative positions along the axis of symmetry X of the male endpiece and the sleeve that are turned toward the side of the insertion direction of the male endpiece, and "behind" or "rear" designate relative positions along the axis X turned toward the side opposite this direction (i.e., on the hose side).

The quick coupling 1 according to the invention illustrated in FIG. 2 essentially comprises a tubular sleeve 10 based on a plastic or plastic matrix composite material gripping a flexible hose (not shown) and axially locking a rigid male endpiece 20 by a locking member (not shown, for example of the pin type) mounted through the sleeve 10 and that cooperates with a peripheral protrusion 21 of the endpiece 20 (the locking member can, in a known manner, include at least two elastic locking wings joined by a gripping head and transversely reversibly pushed in through two apertures formed in front of the sleeve 10 to be blocked, by snapping, in a locked position against the protrusion 21 after the full insertion of the endpiece 20).

More specifically, the sleeve 10, advantageously injection molded from one or several thermoplastic polymers such as PBT (polybutylene terephthalate) or a polyamide (e.g., PA 6, PA 6.6, PA 4.6), in this example has a front portion 11 that is traversed by the locking member and a rear portion 12 that comprises an inner annular recess 13 receiving a seal 30 according to the invention.

The rear portion 12 of the sleeve 10 in this example essentially has a first inner cylindrical face 14 with diameter D1 against which the seal 30 is mounted, and a second inner cylindrical face 15 that has a diameter D2 smaller than D1 and that is connected to the first face 14 by an annular radial shoulder 16. The shoulder 16 defines a recess 13 in connection with an annular spacer 17 that forms an axial stop for the seal 30 and is fastened to the first face 14. As visible in FIG. 2, the spacer 17 has an axial portion 18 that is fastened to the first face 14 via a radial annular slot of the axial portion 18 cooperating with an annular rib 14a of the first face 14 and extends at a right angle by a radial portion 19 axially wedging the seal 30 against the shoulder 16. FIG. 3 shows that the seal 30 has a radial seal height H substantially equal to the radial height of the spacer 17 and the radial height of the shoulder 16.

As illustrated in FIG. 3, the composite seal 30 according to the invention has a U-shaped geometry an axial half-section, comprising:

a radially inner axial annular wing 31, preferably made from an elastomeric material, an elastomeric radially inner face 31a of which is suitable for being gripped against a radially outer cylindrical surface 22 of the endpiece 20 by a return means 32 that pre-stresses the wing 31 radially inward (this means 32 is for example made up of an annular metal radial compression spring that is mounted in a hollow 31ba of a radially outer face 31b of the inner wing 31), a radial annular core 33 that extends at a right angle from a connecting portion forming a hinge 34 of the inner wing 31 while preferably having a base of an elastomeric material and that is reinforced by a radial annular portion 35a of the annular reinforcement 35 made from rigid plastic or metal having an L-shape in axial half-section, and a radially outer axial annular wing 36, preferably with a base of this same elastomeric material, an elastomeric radially outer face 36a of which is intended to be gripped against the first face 14 of the sleeve 10 and which is also reinforced by an axial annular portion 35b of the reinforcement 35 extending the radial portion 35a at a right angle, the core 33 and the wing 36 thus forming an elastomeric/rigid plastic or metal composite.

As shown in FIG. 5, the inner face 31a of the inner wing 31 has, near its free end 31c curved radially outward that wedges the return means 32 in the hollow 31ba, a radially innermost elastomeric circumferential portion 31aa, which, according to the invention, has a rounded convex shape in axial section. In this example, the portion 31aa has an arc of circle shape in axial section giving it a globally truncated torus shape with radius R1 for example equal to 1.0 mm for an outer diameter D0 of the outer surface 22 of the endpiece 20 of about 45 mm (this partial torus being truncated in axial section, due to the fact that the rounded portion 31aa is limited to the inner face 31a of the inner wing 31 and therefore does not close on itself like a circle).

As explained above, the rounded portion 31aa according to the invention, in contact with the endpiece 20, significantly improves the sealing against the transfer fluid (e.g., air) and the resistance to seepage of the seal 30 in the globally static coupling 1, compared with an innermost portion defined in the circumferential edge as in the EP-A1-0,317,903.

As illustrated in FIG. 5, the rounded portion 31aa extends:

toward the closed radial end 31c, by an inflection point generating a concave zone 31d that forms, at its origin, an angle α for example of 45°±7° with the axial direction and that ends with a short axial portion 31e forming a base 30 and 31c, and toward the hinge 34, by an oblique ramp 31ab that extends radially inward while forming an angle β with the axial direction X for example of 20°±10° and that ends with a circumferential protection lip 31f (see FIG. 3) extending obliquely radially inward at the end of the ramp 31ab and in the extension of the core 33.

The hinge 34 has a thickness for example of about 0.75 mm for an outer diameter D0 of the endpiece 20 of about 45 mm, having specified that in the illustrated example, the inner wing 31a becomes thinner via its oblique ramp 31ab and its axial outer face 31b, from the rounded portion 31aa until it reaches a minimal thickness at the hinge 34.

Furthermore and as in particular shown in FIG. 5, the circumferential return means 32 is centered axially offset by a distance L1 toward the core 33 relative to the rounded portion 31aa (i.e., the radial axis of symmetry X1 of the portion 31aa is not combined with the axis of symmetry X2 of the return means 32, this axis X2 being closer to the core 33 than the axis X1).

The core 33 comprises a radially inner portion 33a adjacent to the hinge 34 with a maximal axial thickness that extends, via a shoulder narrowing the inner portion 33a, by a radially outer portion 33b adjacent to the outer wing 36. The reinforcement 35, which is preferably made from metal (for example made from steel of type DC01, having specified the other metals, alloys or not, can be used), extends radially and continuously over these two portion 33a and 33b.

As shown in FIG. 3, the outer wing 36 comprises, on its outer face 36a, first and second circumferential elastomer bosses 37a and 37b axially spaced apart and that are suitable for being pressed against the first inner face 14 of the sleeve 10 within the recess 13 and that each have, in axial section, an arc of circle shape giving them a truncated torus circumferential shape. The second boss 37b, which is axially closest to the free end 38 of the outer wing 36, extends by an elastomeric circumferential end sealing lip 38 that is intended to be pressed by the pressurized fluid against the inner face 14 and the shoulder 16 within the recess 13 and that extends axially moving away from the core 33 and obliquely radially inward.

As illustrated by FIG. 4, the lip 38 has:
- a slightly profiled shape up to an end edge 38a of the lip 38 (i.e., a thickness continuously decreasing after the end edge 38a, such that the angle γ formed between the radially outer edge 38b (which extends the second boss 37b) and the radially inner edge 38c of the lip 38 is thus 12° and the edge 38a has a thickness of about 0.3 mm; and
- a length L2 projected in the axial direction X of 1.6 mm for an outer diameter D0 of the endpiece 20 of about 45 mm, having specified that the lip 38, when idle, forms an angle δ with the radial direction Y of about 65°.

As explained above, the lip 38 improves the sealing of the outer wing 36 of the seal 30 against the sleeve 10 via the pressure of the fluid applying it within the recess 13 against the first face 14 of the sleeve 10 and the shoulder 16, which improves the sealing with the recess 13 over time owing to the pressure of the fluid. The sealing between the outer wing 36 and the recess 13 is thus provided by the compression of the seal 30 at the assembly and is preserved over time by the reinforcement 35 and the sealing lip 38.

The bosses 37a and 37b give the seal a second tightness with the recess 13 in addition to the first tightness procured by the lip 38, having specified that owing to the lip 38, any sealing flaw of the bosses 37a and 37b over time, due to the remanent deformation caused by the aging of their component elastomer, is overcome.

In the example of FIG. 3, the annular reinforcement 35 extends radially along inner 33a and outer 33b portions of the core 33 and axially along the outer wing 36, having specified that the reinforcement 35:
- is embedded in the inner portion 33a of the core 33, i.e., the radially inner annular edge 35aa of the reinforcement 35 is axially surrounded by the elastomeric material of the seal 30 both on the inner side of the core 33 (turned toward the wings 31 and 36) and the outer side of the core 33 (turned opposite the wings 31 and 36), and
- continuously defines the inner face of the core 33 in its outer portion 33b and in the inner face 36b of the outer wing 36 over the majority of the latter (i.e., the reinforcement 35 is not embedded therein, but only covered on its outer face with the elastic material of the seal 30), having specified that the radially outer annular edge 35ba of the reinforcement 35 (shown in FIG. 4) is embedded in this elastomeric material while being surrounded by the latter also over a reduced zone of its inner face.

The invention claimed is:

1. A composite annular seal having a flexible body and a rigid reinforcement, the seal being usable in a rapid fluid-transfer coupling comprising a female tubular sleeve and a male tubular endpiece that is mounted radially inside the sleeve to produce globally static sealing between an inner recess of the sleeve and a cylindrical outer surface of the endpiece, the seal comprising:
- a radially inner axial wing having a radially inner face which has a radially innermost flexible peripheral portion applied tightly against said outer surface of the endpiece,
- a radially outer axial wing having a flexible radially outer face pressed firmly against said recess, and
- a core connecting said inner wing to said outer wing, wherein said innermost peripheral portion is convex, with a rounded shape in axial section,
wherein said outer face of said outer wing comprises at least one circumferential flexible boss that is pressed against said recess and that has, in axial section, an arc of circle shape giving it a truncated torus circumferential shape,
and
wherein said outer wing comprises a free end formed by a circumferential flexible sealing lip that configured to be pressed by said pressurized fluid against said recess when in use, and which extends axially while moving away from said core and radially inward.

2. The seal according to claim 1, wherein said innermost circumferential portion has an arc of circle shape in axial section giving it a truncated torus circumferential shape.

3. The seal according to claim 2, wherein said innermost circumferential portion has a radius comprised between 0.5 mm and 3.0 mm for an inner diameter of said inner wing in the state applied against the endpiece comprised between 35 mm and 100 mm.

4. The seal according to claim 1, wherein said inner wing is provided with a spring that pre-stresses it radially inward.

5. The seal according to claim 4, wherein said spring comprises an annular metal radial compression spring that is mounted on a radially outer face of said inner wing while being centered axially offset by a distance relative to said innermost circumferential portion.

6. The seal according to claim 1, wherein said circumferential flexible sealing lip has a length projected in the axial direction comprised between 0.8 mm and 3.0 mm for an inner diameter of said inner wing in the state gripped against the endpiece comprised between 35 mm and 100 mm.

7. The seal according to claim 1, wherein said outer face of said outer wing comprises several said bosses separated by an axial segment.

8. The seal according to claim 7, wherein said outer face of said outer wing comprises first and second bosses which are axially spaced apart, said second boss, which is axially closest to the free end of the outer wing, extends by said circumferential flexible sealing lip.

9. The seal according to claim 1, wherein the when idle, the seal has a substantially U-shaped axial section, said core extending radially and being reinforced by said reinforcement, which extends in that said outer wing while forming a "L" in axial section, said reinforcement being made from metal or rigid plastic and angularly and continuously reinforcing the elastomeric body of the seal, the elastomeric seal body comprising said innermost circumferential portion and said outer face of the outer wing.

10. The seal according to claim 1, wherein said innermost circumferential portion extends axially toward said core by an oblique ramp extending radially inward to a connecting portion forming a hinge that can connect said inner wing to said core and be provided with a circumferential protection lip extending radially inward at the end of said ramp.

11. The seal according to claim 10, wherein said hinge has a thickness comprised between 0.5 mm and 1.0 mm for an inner diameter of the inner wing in the state gripped against the endpiece comprised between 35 mm and 100 mm.

12. A quick fluid-transfer coupling usable to couple a rigid male tubular endpiece to a flexible female hose, the coupling comprising:

a female tubular sleeve, the endpiece, which is mounted radially and axially inside the sleeve and which has a cylindrical outer surface, and an annular seal according to claim 1, further comprising a reinforcement that is housed in an inner recess of the sleeve and is suitable for being gripped against said outer surface of the endpiece so as to produce globally static sealing between the sleeve and the endpiece.

13. The coupling according to claim 12, wherein the sleeve and the endpiece are not movable in permanent relative rotation during fluid transfer, only being able to be movable in relative translation and/or alternating rotation during operation during said transfer.

14. The coupling according to claim 12, wherein said recess is defined by:

a first inner cylindrical face of the sleeve having a first diameter, a second inner cylindrical face of the sleeve having a second diameter smaller than said first diameter, an annular shoulder that radially connects said first face to said second face, and an annular stop for the seal that extends radially from said first face and against which the seal is axially juxtaposed, wherein the seal is mounted bearing against said first face of the sleeve while being wedged in said shoulder and said stop and while having a radial seal height substantially equal to that of said shoulder.

15. The coupling according to claim 14, wherein said stop comprises a spacer including an axial fastening portion mounted below said first face and a radial stop portion that extends said axial portion toward said shoulder and that has a radial stop height substantially equal to said radial height of the seal.

* * * * *